(12) United States Patent
Ledru et al.

(10) Patent No.: US 6,987,234 B2
(45) Date of Patent: Jan. 17, 2006

(54) CIRCUIT BREAKER COMPRISING A CONTROL ASSEMBLY AND INTERRUPTING CHAMBER AND METHOD OF ASSEMBLY

(75) Inventors: Roger Ledru, Tignieu (FR); Wolfgang Grieshaber, Lyons (FR)

(73) Assignee: Alstom, Paris (FR)

( * ) Notice: Subject to any disclaimer, the term of this patent is extended or adjusted under 35 U.S.C. 154(b) by 39 days.

(21) Appl. No.: 10/695,447

(22) Filed: Oct. 29, 2003

(65) Prior Publication Data

US 2004/0216991 A1  Nov. 4, 2004

(30) Foreign Application Priority Data

Oct. 30, 2002  (FR) .................................. 02 13598

(51) Int. Cl.
*H01H 3/40* (2006.01)
*H01H 33/42* (2006.01)
*F16D 3/18* (2006.01)

(52) U.S. Cl. ....................... 200/501; 218/154; 464/185

(58) Field of Classification Search ................ 200/400, 200/501; 218/78, 84, 92, 120, 153, 154; 464/156, 185, 154
See application file for complete search history.

(56) References Cited

FOREIGN PATENT DOCUMENTS

| EP | 0727340 | 8/1996 |
|----|---------|--------|
| FR | 598412  | 12/1925 |
| FR | 1383339 | 12/1964 |

*Primary Examiner*—James R. Scott
(74) *Attorney, Agent, or Firm*—Dowell & Dowell, P.C.

(57) ABSTRACT

A circuit breaker including a control assembly having a driving and a driven splined shafts and a pair of arcing contacts movable by the control assembly. A synchronization assembly is provided for synchronizing the two splined shafts and includes two levers each of which is provided with a splined ring that co-operates with one of the splined shafts. One of the splined rings has a number of meshing elements which is different than a number of meshing elements on the splined shaft with which it co-operates and an adapter is seated between the one of the splined rings and the splined shaft with which it co-operates.

17 Claims, 6 Drawing Sheets

CIRCUIT BREAKER COMPRISING A CONTROL ASSEMBLY AND INTERRUPTING CHAMBER AND METHOD OF ASSEMBLY

BACKGROUND OF THE INVENTION

1. Field of the Invention

The present invention relates to a circuit-breaker comprising a control assembly and an interrupting chamber. It also relates to a method of assembling such a circuit-breaker, and to an auxiliary member for performing such assembly.

2. Description of the Related Art

Conventionally, such a circuit-breaker comprises a control assembly that is associated with an interrupting chamber. The chamber contains a pair of arcing contacts, at least one of which can be moved under the action of the control assembly. The moving contact can thus be moved between two distinct positions, corresponding respectively to opening and to closure of the circuit-breaker.

The above-mentioned control assembly is suitable for storing mechanical energy, in particular by means of the presence of springs. It is also provided with a splined control shaft that can be caused to turn by releasing the mechanical energy stored in the control assembly.

The interrupting chamber is provided with another splined control shaft which, when turned, makes it possible to move the moving contact between the two above-mentioned positions. Finally, a synchronization assembly in the form of a deformable parallelogram is provided for mutually synchronizing the two control shafts.

More precisely, said synchronization assembly is made up firstly of two levers, each of which is provided with a ring suitable for co-operating with a corresponding splined shaft. The facing ends of the levers are also connected together via connection rods hinged to said levers.

When the above-described circuit-breaker is to be assembled, the operator is provided firstly with a control assembly whose splined shaft lies in a given position, and secondly with an interrupting chamber whose control shaft also lies in a given position. Starting from these positions, the operator must then fit the synchronization assembly together, in particular by putting the two rings into co-operation with the two above-mentioned splined shafts.

It is easy to understand that achieving both fits can be particularly difficult. This difficulty is due in particular to the manufacturing tolerances for the various elements of the circuit-breaker.

In this situation, the only economically viable solution consists in modifying the angular position of the shaft of the interrupting chamber so as to enable the two rings and the two shafts to co-operate.

Turning the shaft of the interrupting chamber through an angle that can be as great as several degrees generally results in an inacceptable modification in the position of the moving contact.

OBJECTS AND SUMMARY OF THE INVENTION

In this context, an object of the invention is to provide a circuit-breaker that makes it possible to remedy the above-mentioned drawbacks.

More particularly, an object of the invention is to provide such a circuit-breaker whose synchronization assembly makes it possible to transmit high torque.

A further object is to provide such a circuit-breaker whose synchronization assembly can be fitted on both control shafts of the circuit-breaker, by turning the shaft of the interrupting chamber through an angle that is small, in particular less than 0.2°.

Finally, an object of the invention is to provide such a circuit-breaker whose synchronization assembly has small clearances when in operation, while offering satisfactory flexibility, in particular as regards assembling it and disassembling it.

To this end, the invention provides a circuit-breaker comprising a control assembly having a "driving" first splined control shaft, said circuit-breaker also comprising an interrupting chamber having at least one moving arcing contact and also a "driven" second splined control shaft suitable for moving, the moving contact between opening and closure positions, said circuit-breaker further comprising a synchronization assembly for synchronizing said driving and driven shafts, said synchronization assembly comprising two levers, each of which is provided with a splined ring suitable for co-operating with a corresponding shaft, and two connection rods, each of which is hinged at both of its ends to respective ones of said levers; wherein one of said rings has a number of meshing elements that is different from the number of meshing elements on the splined shaft with which it co-operates, and wherein an adapter is interposed between said ring and said shaft, said adapter having internal meshing elements suitable for co-operating with the meshing elements on the driving shaft, and external meshing elements suitable for co-operating with the meshing elements on said splined ring.

According to other characteristics of the invention:

the number of meshing elements on said splined ring and the number of meshing elements on the control shaft are mutually prime numbers;

the absolute value of the difference between firstly the number of meshing elements on the control shaft and secondly the number of meshing elements on said splined ring is equal to 1;

the smaller of the numbers of meshing elements on the control shaft and of meshing elements on the splined ring is greater than twelve, and preferably greater than twenty six;

the control shaft has thirty-six meshing elements while the splined ring has thirty-five meshing elements;

the adapter is marked with an identification marker extending radially and/or angularly;

the identification marker extends between an internal setback and an external meshing element, both of which are in alignment, on the link element;

the identification marker is situated radially in register with another marker provided on the splined ring and/or on the control shaft; and the other splined ring has the same number of meshing elements as the control shaft on which it is mounted, so as to co-operate directly with said control shaft.

The invention also provides a method of assembling the circuit-breaker as defined above, the method comprising the following steps:

the other splined ring is mounted on its shaft;

the inside periphery of the splined ring is disposed in the vicinity of the outside periphery of its control shaft, so that said inside and outside peripheries form a gap between them; and the link element is inserted into said gap so as to cause it to co-operate both with the control shaft and with the first splined ring.

According to other characteristics of the invention:

before the link is inserted into the gap:

a hollow auxiliary member is used that has internal meshing elements that are identical to the internal meshing elements on the adapter, said auxiliary member having an external periphery such that it can be inserted into the gap without interfering with the splined ring, said auxiliary member being provided with uniformly-distributed radial marks, the number of which is identical to the number of said internal meshing elements on the auxiliary member;

the auxiliary member is inserted into the gap;

an "optimum" one of said radial marks is identified that corresponds to a free insertion position in which the adapter can be inserted freely into the gap;

said other marker corresponding to said free insertion position is formed on said splined ring and/or on the shaft;

said auxiliary member is removed from the gap; and the adapter is inserted into said gap, in said optimum insertion position;

while the adapter is being inserted into the gap, the identification marker on the adapter is aligned with said other marker on the splined ring and/or on the shaft;

each radial mark on the auxiliary member extends from an internal setback in said auxiliary member, between two adjacent meshing elements; and the optimum radial mark is identified, which optimum mark is centered optimally relative to a facing setback in the splined ring, and/or relative to a facing meshing element on the shaft.

The invention finally provides an auxiliary member for implementing the method of assembly as defined above, said auxiliary member being hollow and having internal meshing elements provided on its inside periphery, as well as uniformly-distributed radial marks, of which the number is identical to the number of said internal meshing elements.

According to other characteristics of the invention:

each radial mark extends from a setback provided between two internal meshing elements; and the auxiliary member has a smooth outside periphery, in particular a circularly cylindrical outside periphery.

BRIEF DESCRIPTION OF THE DRAWINGS

The invention is described below with reference to the accompanying drawings which are given merely by way of non-limiting example, and in which.

MORE DETAILED DESCRIPTION

Figure 1:
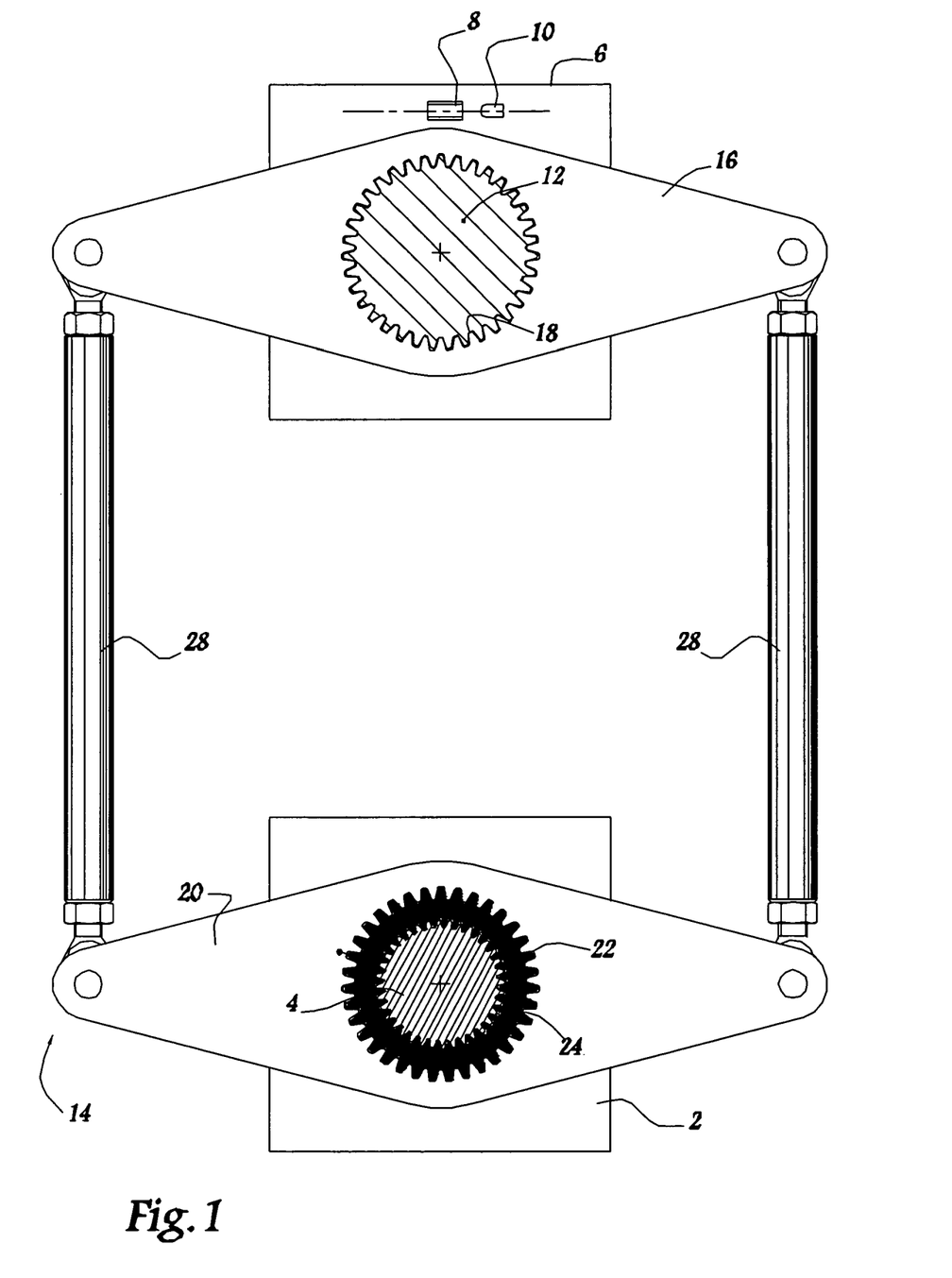
FIG. 1 is a diagrammatic view showing a circuit-breaker of the invention.

The circuit-breaker shown in FIG. 1 includes a control assembly which is shown diagrammatically in the form of a block 2. The control assembly 2, which, in known manner, is capable of storing mechanical energy, in particular by means of springs (not shown) is provided with a splined control shaft 4.

In the context of the present invention, the term "splined" is used to mean that the mechanical member in question is provided with meshing elements, which may, in particular, be teeth or splines. Below, it is assumed that the various mechanical members are provided with splines that form said meshing elements.

The circuit-breaker also includes an interrupting chamber, which is also shown diagrammatically in the form of a block 6. In conventional manner, the interrupting chamber 6 has fixed and moving contacts, respectively 8 and 10, both of which are also shown diagrammatically.

A splined interrupting chamber shaft 12 is also provided which, by turning, moves the moving contact 10. The moving contact can thus take up two end positions corresponding respectively to closure and to opening of the circuit-breaker.

The shafts 4 and 12 are interconnected via a synchronization assembly given overall reference 14.

This assembly 14 includes firstly a first lever 16 in which a central splined ring 18 is provided that serves to co-operate directly with the shaft 12. Thus, said shaft 12 and said ring 18 have the same number of splines.

Figure 2:
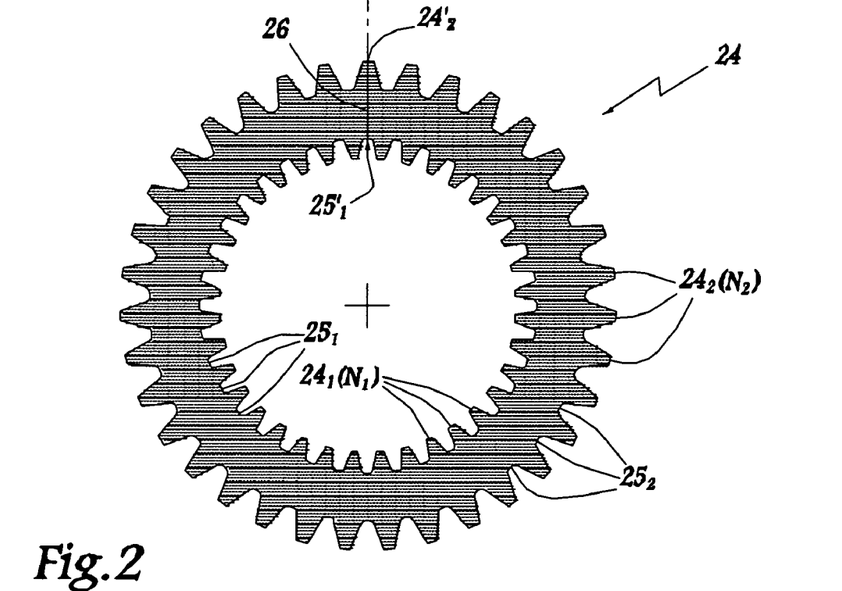
FIG. 2 is an end view showing an adapter that is part of the synchronization assembly with which the circuit-breaker of FIG. 1 is provided.

The synchronization assembly 14 also includes a second lever 20 which is of the same length as the first lever 16, and in which a central splined ring 22 is provided. This central splined ring co-operates indirectly with the shaft 4 in that their mutual meshing is achieved via an adapter, which is more particularly visible in FIG. 2;

The adapter 24, which is hollow, has internal splines $24_1$ suitable for co-operating with the external splines $4_1$ on the shaft 4, as well as external splines $24_2$ suitable for co-operating with the internal splines $22_1$ in the ring 22. These splines $4_1$ and $22_1$ can be seen in FIG. 4A.

The setbacks defined by two adjacent splines $22_1$ (FIG. 4A) are referenced $23_1$, the setbacks defined by two adjacent splines $24_1$ (FIG. 2) are referenced $25_1$, and the setbacks defined by two adjacent splines $24_2$ (FIG. 2) are referenced $25_2$.

In addition, reference $N_1$ denotes the number of splines $4_1$ and $24_1$ present respectively on the shaft 4 and on the inside of the adapter 24, and reference $N_2$ denotes the number of splines $24_2$ and $22_1$ provided respectively on the outside of the adapter 24 and on the ring 22.

It should also be observed that $N_1$ and $N_2$ are different, that they are advantageously mutually prime numbers, and in particular that the absolute value of their difference is equal to 1.

In the example described and shown, it is assumed that $N_1$ is equal to 36, while $N_2$ is equal to 35.

In which case, since 35 and 36 are mutually prime numbers, only one pair made up of an internal setback and of an external spline of the adapter exists that is radially aligned. This internal setback is referenced $25'_1$ and this external spline is referenced $24'_2$, while their common axis is referenced $A_1$ (FIG. 2).

It should be noted that a visible marker 26, implemented by any suitable means, extends along said axis $A_1$. The function of the marker 26, which is a radial line in this example, is explained below.

Finally, the synchronization assembly 14 includes two connection rods 28 (FIG. 1) of the same length, each of which interconnects two facing ends of the levers 16 and 20. It should be noted that the levers 16 and 20 thus form a deformable parallelogram with the connection rods 28.

To trigger circuit-breaker opening or closure, a control signal is sent in a manner known per se to the control assembly 2. The control signal then releases the accumulated energy so as to cause the control shaft 4, which is referred to as the "driving shaft", to start turning.

Via the synchronization assembly 14, the driving shaft 4 then causes the interrupting chamber shaft 12 or "driven shaft" to turn. The driven shaft then initiates movement of the moving contact 10 relative to the fixed contact 8, so as to place the circuit-breaker in its desired position.

Assembly of the above-described circuit-breaker is explained below.

When assembly is to be commenced, the operator is provided firstly with a control assembly 2 whose driving shaft 4 lies in a given angular position, and secondly with an interrupting chamber 6 whose driven shaft 12 also lies in a given angular position. The synchronization assembly 14 then needs to be fitted relative both to the control assembly and to the interrupting chamber.

Firstly, it should be noted that, in the absence of the adapter 24, such fitting would be particularly difficult. It would then be necessary to fit the rings 18 and 22 directly onto the corresponding shafts 12 and 4.

It can then be understood that, when the control assembly and the interrupting chamber are in certain predetermined positions, the splines of one of the control shafts 4 or 12 might not be in register with the setbacks in the corresponding splined ring 22 or 18, thereby preventing them from mutually co-operating. The only economically viable solution then consists in causing the driven shaft 12 to pivot through a substantial angle that can be as high as 5°, i.e. 180°/$N_1$, which modifies the position of the moving contact 10 unacceptably.

In the invention, the ring 18 in the lever 16 must firstly be fitted onto the driven shaft 12, which does not pose any particular difficulty. Then, the ring 22 in the lever 20 is placed around the driving shaft 4, which does not pose any particular difficulty either, since said ring 22 and said shaft 4 are not designed to co-operate directly.

Figure 4A:
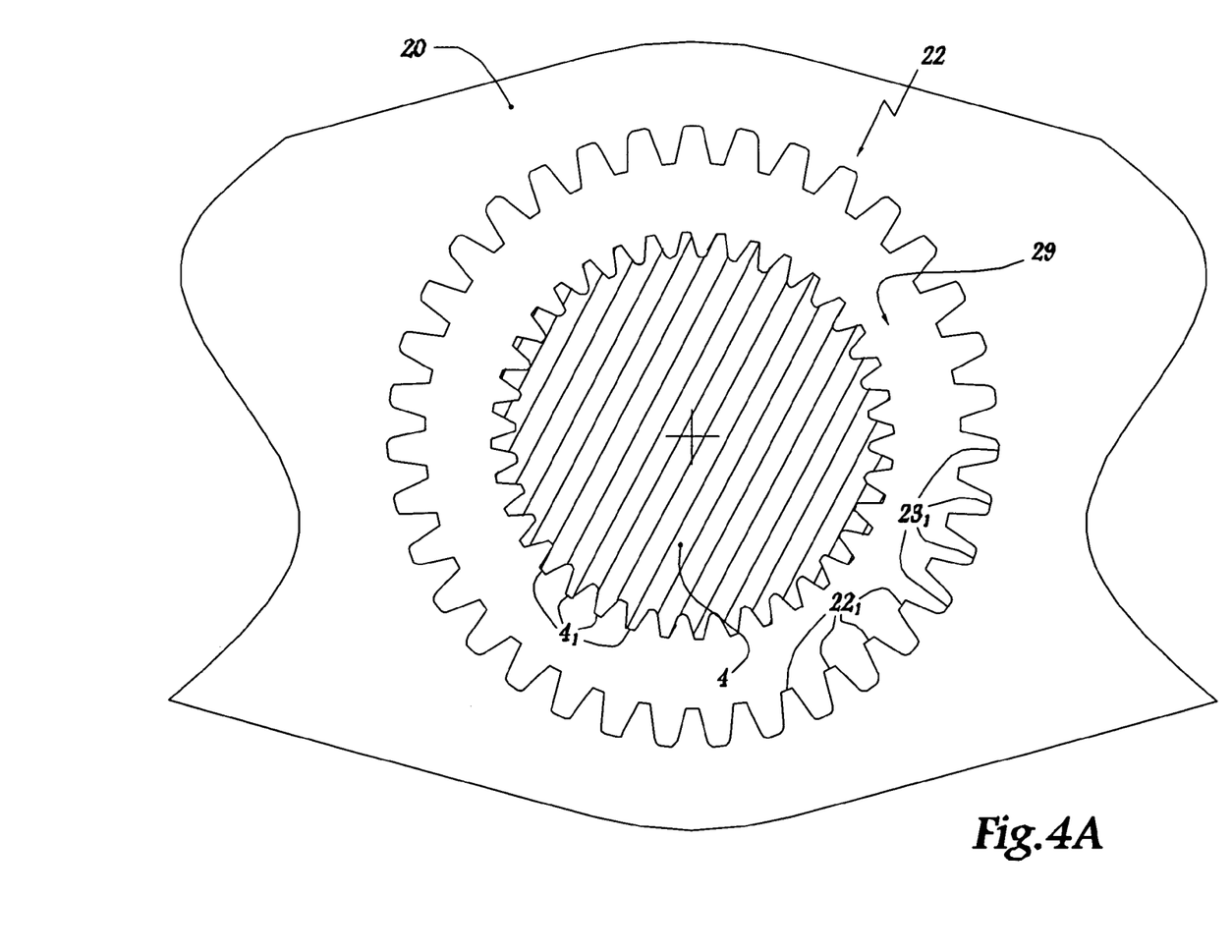
FIGS. 4A to 4C are end views showing various steps in assembling the circuit-breaker of FIG. 1.

At this stage of assembly, the facing faces of said shaft 4 and of said ring 22 define a gap 29 which is visible in FIG. 4A, and in which the adapter 24 is to be received.

It should be noted that a certain angular position of the adapter 24 exists that enables it to be inserted optimally into said gap 29. Such optimal angular positioning corresponds firstly to the splines $4_1$ on the shaft 4 co-operating with the internal splines $24_1$ on the member 24, and secondly to the splines $22_1$ on the ring 22 co-operating with the external splines $24_2$ on the member 24.

The operator can proceed stepwise, by causing the adapter 24 to turn until the optimum angular positioning is identified. However, such a possibility is disadvantageous in that it significantly lengthens the time required for the assembly operation.

Figure 3:
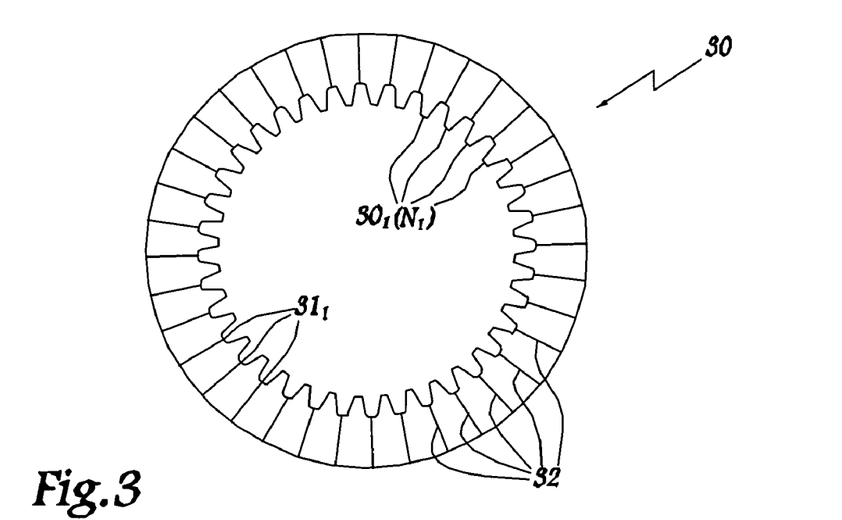
FIG. 3 is an end view analogous to FIG. 2, showing an auxiliary member that is involved in assembling the circuit-breaker of FIG. 1.

It is therefore advantageous for the operator to use an auxiliary member as shown in FIG. 3.

The auxiliary member, which is hollow, is given overall reference 30. It is provided with internal splines $30_1$ the number and pitch of which are identical to those of the splines $24_1$ of the adapter.

In contrast, over its external periphery, the auxiliary member 30 is smooth, i.e. it is not provided with splines. Its outside diameter corresponds substantially to the outside diameter of the adapter 24 as measured at the bases of the external splines $24_2$.

In addition, radial lines 32 are provided on the body of the auxiliary member 30. These lines 32, the number $N_1$ of which corresponds to the number of the splines $30_1$, pass through the middles of the various flutes $31_1$ situated between adjacent splines $30_1$.

Figure 4B:
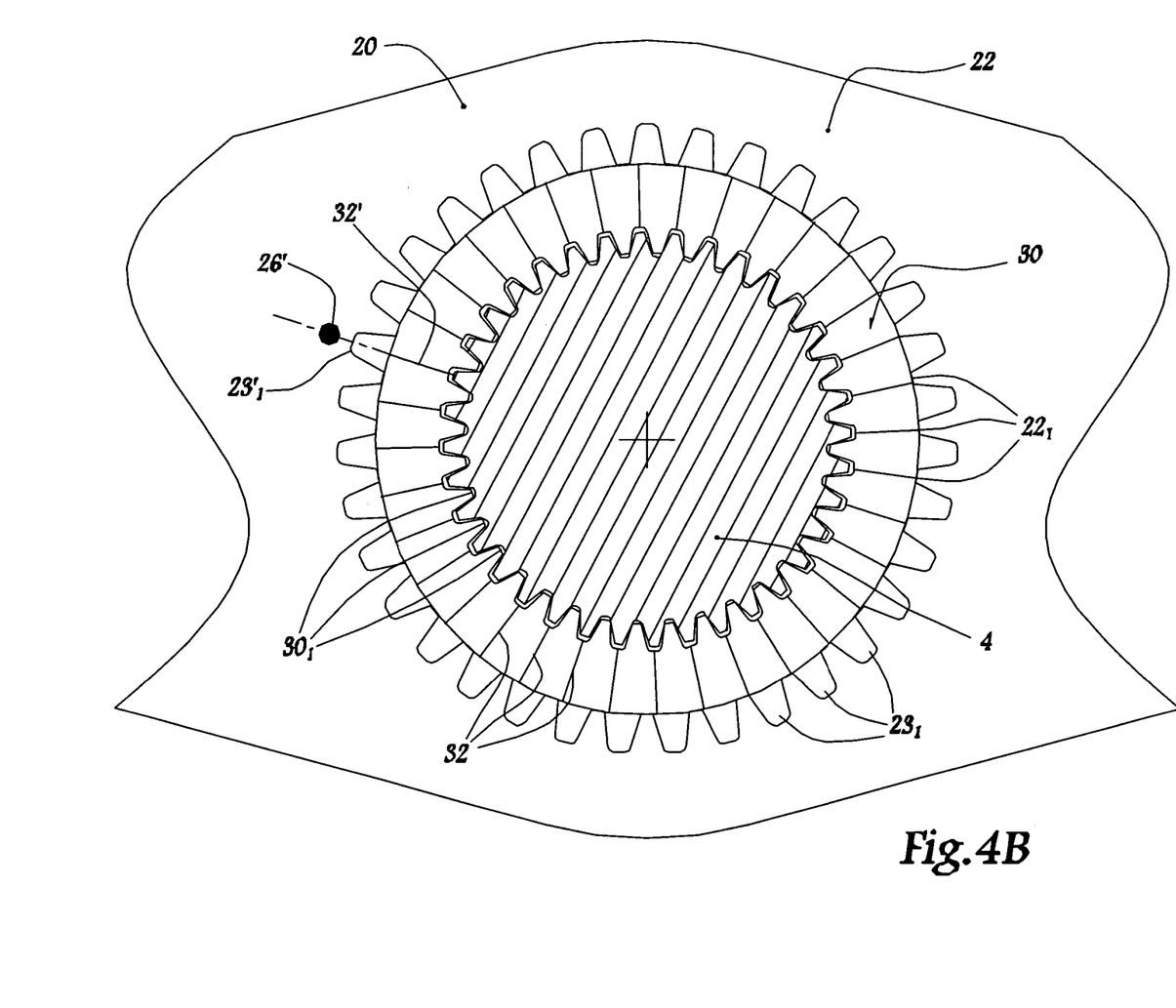

The auxiliary member 30 is then disposed on the shaft 4, as shown in FIG. 4B. This operation does not require any particular precaution to be taken, in particular as regards the angular positioning to impart to the auxiliary member 30. The internal splines $30_1$ co-operate easily with the splines $4_1$, of which there are the same number, while the smooth external surface of the member 30 does not interact with the splines $22_1$ in the ring 22.

Once the auxiliary member has been put in place, it is necessary to identify the line 32' that is best centered, at its radially outermost end, relative to a corresponding setback $23_1$ in the ring 22. The setback in question, which is referred to as the "optimum setback", is given reference $23'_1$, and it is identified by means of a marker 26' provided by the operator in register on the ring.

The auxiliary member 30 must then be removed from the gap 29 defined by the shaft 4 and by the ring 2.

Figure 4C:
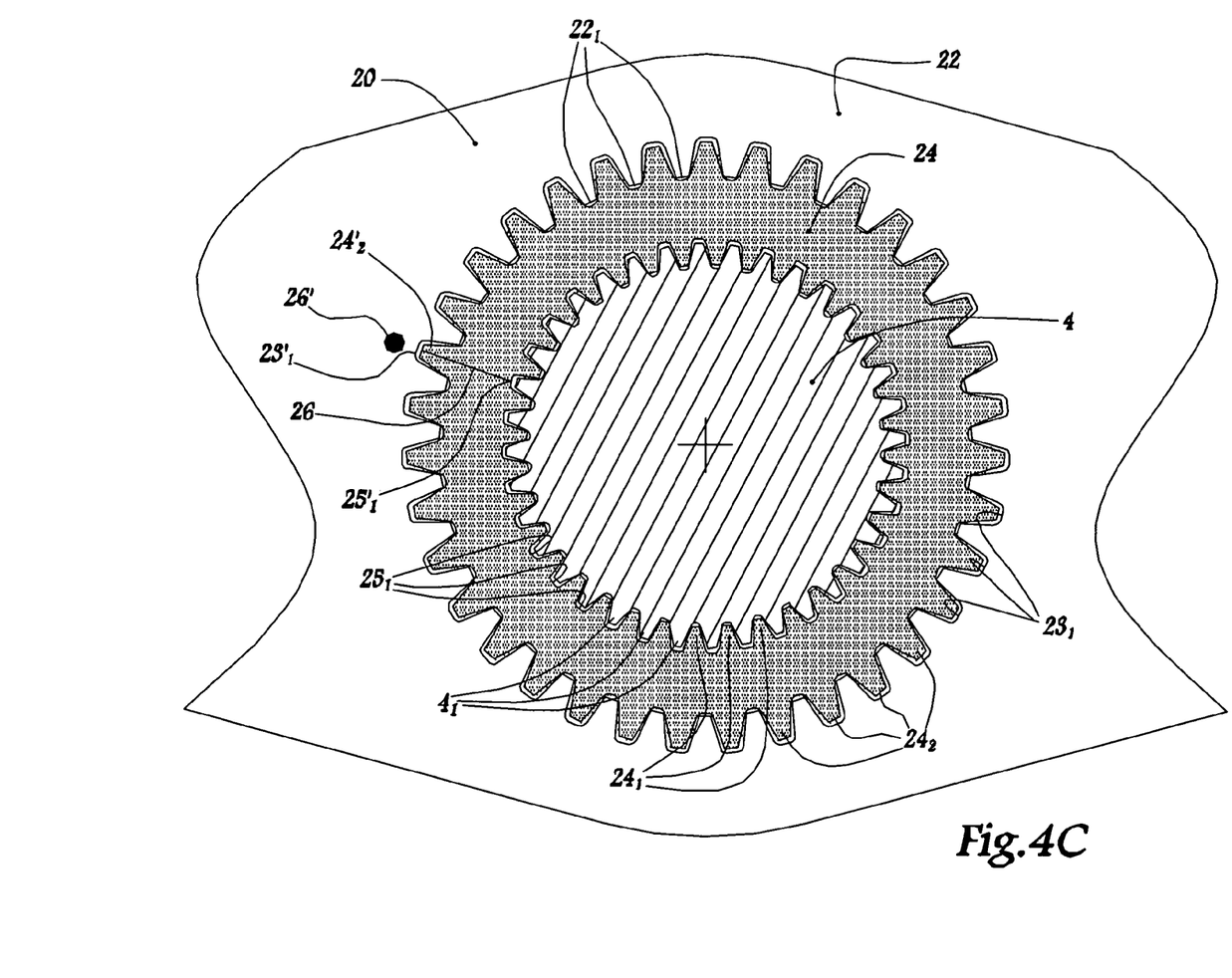

Then, as shown in FIG. 4C, the adapter 24 is disposed in said gap 29, while taking care to place the marker 26 provided on the member 24 in register with the marker 26' provided on the ring 22.

This makes it possible to optimize the double co-operation firstly between the splines $24_1$ and $4_1$, and secondly between the splines $24_2$ and $22_1$.

Thus, the internal flutes $25_1$ on the adapter co-operate accurately with the splines $4_1$ on the driving shaft 4.

In addition, the external splines $24_2$ on the adapter are centered optimally on the flutes $23_1$ provided in the inside periphery of the ring 22. As shown in FIG. 4C, the marker 26 coincides with the line 32' shown in FIG. 4B, which line is centered optimally relative to the flute $23'_1$, as explained above.

In the example described with reference to FIGS. 4A to 4C, a line 32' exists that is accurately centered on one of the setbacks ($23'_1$) in the ring 22. However, it is possible for the "optimum" line to be angularly offset to a certain extent relative to the facing setback in the splined ring.

Figure 5:
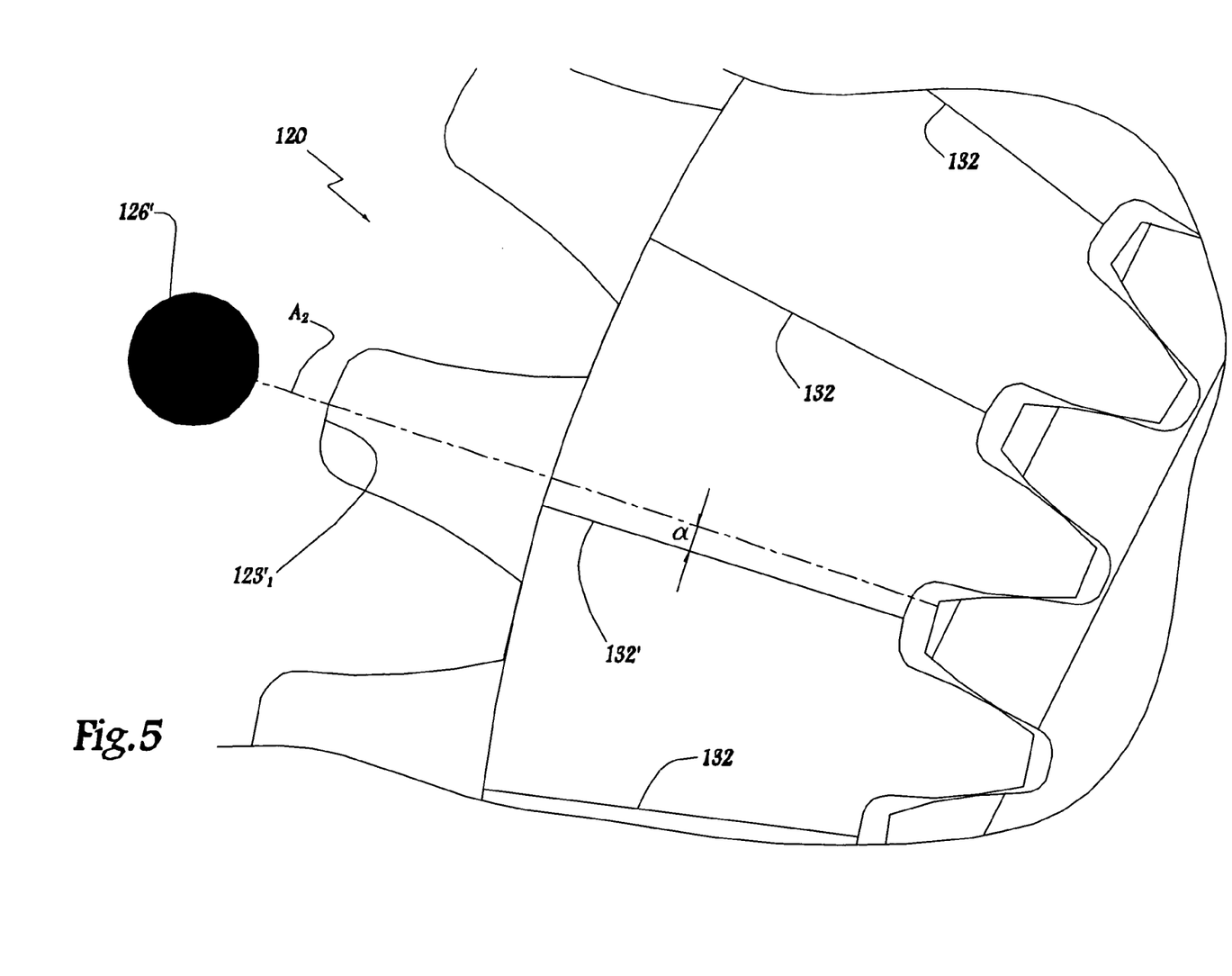
FIG. 5 is an end view on a larger scale, showing a different configuration of the circuit-breaker while it is being assembled.

Such a situation is shown in FIG. 5, in which the mechanical elements that are analogous to those described above are given the same reference numerals plus 100.

As shown in FIG. 5, the "optimum" line 132' has an angular offset referenced $\alpha$ relative to the middle axis $A_2$ of the setback $123'_1$.

It can be understood that, once the setback $123'_1$ has been identified, and then once the auxiliary member has been removed from the gap, the adapter cannot be inserted as the situation stands, because of the existence of said angular offset $\alpha$. The splined ring 120 must therefore be turned through said angle $\alpha$, accompanied by pre-turning the interrupting chamber shaft 12.

For this purpose, the maximum value of said angle $\alpha$ can be determined on the basis of the numbers of splines $N_1$ and $N_2$. Thus, the maximum value, expressed in degrees, is equal to $180 \times ABS((N_2-N_1)/(N_1 \times N_2))$, where ABS corresponds to the absolute value of the number expressed in brackets.

In the above-mentioned case, where $N_1$ is equal to 36, while $N_2$ is equal to 35, said maximum angle $\alpha$ is equal to 0.14°. It can thus be understood that such turning of the control shaft 12 does not affect the proper operation of the circuit-breaker, unlike the situation prevailing in the prior art.

The invention is not limited to the examples described and shown.

Thus, it is possible to make provision for the various lines 32 provided on the auxiliary member 30 not to be aligned with the middle axes of respective setbacks $31_1$, but rather, for example, to be aligned with the middle axes of respective splines $30_1$. In which case, the marker 26 then extends between an internal spline and an external setback on the adapter.

In addition, it is possible to make provision to form a marker analogous to the marker 26' or 126' on the shaft 4, in addition to or in place of the marker provided on the ring 22 of the lever 20. For this purpose, each marker may be provided in a manner other than radially, and in particular angularly.

Furthermore, it is possible to make provision to use the adapter 24 at the top lever 16 instead of at the bottom lever 20. In which case, the adapter is then interposed between the facing faces of the control shaft 12 and of the splined ring 18, while the shaft 4 and the splined ring 22 co-operate directly.

What is claimed is:

1. A circuit-breaker comprising a control assembly having a driving first splined control shaft, the circuit-breaker also including an interrupting chamber having at least one moving arcing contact and also a driven second splined control shaft for moving the moving contact between opening and closure positions, the circuit-breaker further including a synchronization assembly for synchronizing said driving and driven shafts, said synchronization assembly comprising two levers, each of which is provided with a splined ring for co-operating with a corresponding splined control shaft, and two connection rods, each of which is hinged at opposite ends thereof to respective ones of said levers;
   wherein one of said splined rings has a number of meshing elements that is different from a number of meshing elements on the splined control shaft with which it co-operates, and wherein an adapter is interposed between said one of said splined rings and said splined control shaft with which it co-operates, said adapter having internal meshing elements for co-operating with the meshing elements on the splined control shaft with which said one of said splined rings co-operates and external meshing elements for co-operating with the meshing elements on said one of said splined rings.

2. A circuit-breaker according to claim 1, wherein the number of meshing elements on said one of said splined rings and the number of meshing elements on the splined control shaft with which it cooperates are mutually prime numbers.

3. A circuit-breaker according to claim 2, wherein the splined control shaft with which said one of said splined rings co-operates has thirty-six meshing elements while said one of said splined rings has thirty-five meshing elements.

4. A circuit-breaker according to claim 1, wherein an absolute value of the difference between firstly the number of meshing elements on the splined control shaft with which said one of said splined rings co-operates and secondly the number of meshing elements on said one of said splined rings is equal to 1.

5. A circuit-breaker according to claim 1, wherein the smaller of the numbers of meshing elements on the splined control shaft with which said one of said splined rings co-operates and of meshing elements on said one of said splined rings is greater than twelve.

6. A circuit-breaker according to claim 1, wherein the adapter is marked with an identification marker that extends outwardly from an inner to an outer portion thereof.

7. A circuit-breaker according to claim 6, wherein the identification marker extends radially outwardly between an internal setback and an external meshing element, both of which are in alignment, on the adapter.

8. A circuit-breaker according to claim 6, wherein the identification marker is situated radially in register with another marker provided on said one of said splined rings.

9. A circuit-breaker according to claim 1, wherein the other splined ring has the same number of meshing elements as a splined control shaft on which it is mounted, so as to co-operate directly therewith.

10. A method of assembling the circuit-breaker according to claim 1, the method comprising the following steps:
   the other splined ring is mounted on the splined control shaft with which it co-operates;
   an inside periphery of said one of the splined rings is disposed in a vicinity of an outside periphery of the splined control shaft with which it co-operates, so that said inside and outside peripheries form a gap between them; and
   an adapter is inserted into said gap so as to cause it to co-operate both with said one of said splined rings and the splined control shaft with which it co-operates.

11. A method of assembly according to claim 10, wherein before the adapter is inserted into the gap:
   an auxiliary member is provided that has internal meshing elements that are identical to the internal meshing elements on the adapter, said auxiliary member having an external periphery such that it can be inserted into the gap without interfering with said one of said splined rings, said auxiliary member being provided with uniformly distributed radial marks, the number of which is identical to the number of said internal meshing elements of the auxiliary member;
   the auxiliary member is inserted into the gap;
   an optimum one of said radial marks is identified that corresponds to a free insertion position in which the adapter can be inserted freely into the gap;
   an identification mark corresponding to said free insertion position is provided on one of one of said splined ring and the shaft;
   said auxiliary member is removed from the gap; and
   the adapter is thereafter inserted into said gap, in said free insertion position.

12. A method of assembly according to claim 11, wherein another marker is provided on the adapter and, while the adapter is being inserted into the gap, the another marker on the adapter is aligned with said identification mark on one of said one of the splined rings and the shaft.

13. A method of assembly according to claim 11, wherein each radial mark on the auxiliary member extends from an internal setback in said auxiliary member between two adjacent meshing elements.

14. A method of assembly according to claim 13, wherein the optimum radial mark is identified which is centered relative to one of a facing setback in said one of the splined ring, and a facing meshing element on the shaft.

15. An auxiliary member for implementing the method of assembly according to claim 10, said auxiliary member having internal meshing elements provided on an inside periphery, and uniformly distributed radial marks, of which the number is identical to the number of said internal meshing elements.

16. An auxiliary member according to claim 15, wherein each radial mark extends from a setback provided between two of said internal meshing elements.

17. An auxiliary member according to claim 15, having a smooth generally cylindrical outside periphery.

* * * * *